United States Patent
Wu et al.

(10) Patent No.: US 9,949,182 B2
(45) Date of Patent: Apr. 17, 2018

(54) CELL RESELECTION METHOD, DEVICE, AND SYSTEM

(71) Applicant: HUAWEI TECHNOLOGIES CO., LTD., Shenzhen (CN)

(72) Inventors: Tong Wu, Beijing (CN); Jing Han, Beijing (CN); Anjian Li, Beijing (CN); Yuan He, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 310 days.

(21) Appl. No.: 14/249,699

(22) Filed: Apr. 10, 2014

(65) Prior Publication Data

US 2014/0220978 A1  Aug. 7, 2014

Related U.S. Application Data

(63) Continuation of application No. PCT/CN2012/077483, filed on Jun. 25, 2012.

(30) Foreign Application Priority Data

Oct. 13, 2011  (CN) .......................... 2011 1 0310174

(51) Int. Cl.
H04W 36/00  (2009.01)
H04W 48/10  (2009.01)
(Continued)

(52) U.S. Cl.
CPC ... *H04W 36/0083* (2013.01); *H04W 36/0061* (2013.01); *H04W 48/10* (2013.01);
(Continued)

(58) Field of Classification Search
CPC ......... H04W 36/0083; H04W 36/0061; H04W 48/10; H04W 84/045; H04W 48/12; H04W 48/20; Y02B 60/50
See application file for complete search history.

(56) References Cited

U.S. PATENT DOCUMENTS

2001/0031638 A1  10/2001  Korpela et al.
2003/0125088 A1  7/2003  Brigant et al.
(Continued)

FOREIGN PATENT DOCUMENTS

CN  1433229  7/2003
CN  101129002  2/2008
(Continued)

OTHER PUBLICATIONS

3GPP TS36.331 v10.3.0, Sep. 2011, Release 10, The 3rd Generation Partnership Project.*

(Continued)

*Primary Examiner* — Kathy Wang-Hurst
*Assistant Examiner* — Said Elnoubi
(74) *Attorney, Agent, or Firm* — Staas & Halsey LLP

(57) ABSTRACT

Embodiments of the present invention provide a cell reselection method, device, and system, where the method includes: receiving a broadcast message sent in a first cell by a base station, where the broadcast message includes information about a set of second cells; when it is determined, according to the information about the set of the second cells, that a target reselection cell is a second cell, determining, according to second-cell reselection parameter information, time for performing cell reselection; or when it is determined, according to the information about the set of the second cells, that a target reselection cell is not a second cell, determining, according to first-cell reselection parameter information, time for performing cell reselection.

15 Claims, 4 Drawing Sheets

(51) Int. Cl.
  *H04W 84/04* (2009.01)
  *H04W 48/12* (2009.01)
  *H04W 48/20* (2009.01)

(52) U.S. Cl.
  CPC ............ *H04W 48/12* (2013.01); *H04W 48/20* (2013.01); *H04W 84/045* (2013.01); *Y02B 60/50* (2013.01)

(56) References Cited

U.S. PATENT DOCUMENTS

| | | |
|---|---|---|
| 2006/0258386 A1 | 11/2006 | Jeong et al. |
| 2009/0213812 A1 | 8/2009 | Park et al. |
| 2010/0027510 A1* | 2/2010 | Balasubramanian . H04W 48/18 370/332 |
| 2010/0029274 A1 | 2/2010 | Deshpande et al. |
| 2010/0278146 A1* | 11/2010 | Aoyama ............... H04W 48/20 370/331 |

FOREIGN PATENT DOCUMENTS

| | | |
|---|---|---|
| CN | 101132614 | 2/2008 |
| CN | 101742575 A | 6/2010 |
| CN | 101772118 | 7/2010 |
| CN | 102113385 | 6/2011 |
| WO | 2006/096036 A1 | 9/2006 |

OTHER PUBLICATIONS

3GPP TSG-RAN4 Meeting #60, Aug. 2011, The 3rd Generation Partnership Project.*
3GPP TSG-RAN 4 Meeting #60, Aug. 22-26, 2011.*
3GPP TS 36.331, Radio Resource Control (RRC), 3rd Generation Partnership Project, Sep. 2011.*
International Search Report dated Oct. 4, 2012, in corresponding International Application No. PCT/CN2012/077483.
PCT International Search Report and Written Opinion of the International Searching Authority dated Oct. 4, 2012 in corresponding International Patent Application No. PCT/CN2012/077483.
"3$^{rd}$ Generation Partnership Project; Technical Specification Group Radio Access Network; Evolved Universal Terrestrial Radio Access (E-UTRA); Radio Resource Control (RRC); Protocol specification (Release 10)", 3GPP TS 36.331 V10.3.0, Sep. 2011, pp. 1-296.
"3$^{rd}$ Generation Partnership Project; Technical Specification Group Radio Access Network; Evolved Universal Terrestrial Radio Access (E-UTRA); User Equipment (UE) procedures in idle mode (Release 10)", 3GPP TS 36.304 V10.3.0, Sep. 2011, pp. 1-33.
3$^{rd}$ Generation Partnership Project; Technical Specification Group Radio Access Network; Evolved Universal Terrestrial Radio Access (E-UTRA); Requirements for support of radio resource management (Release 10), 3GPP TS 36.133 V10.4.0, Sep. 2011, pp. 1-489.
Chinese Office Action dated Oct. 10, 2014 in corresponding Chinese Patent Application No. 201110310174.4.
Chinese Search Report dated Sep. 25, 2014 in corresponding Chinese Patent Application No. 201110310174.4.
Chinese Office Action and Search Report dated Jun. 17, 2015 in corresponding Chinese Patent Application No. 201110310174.4.
Extended European Search Report dated Apr. 1, 2015 in corresponding European Patent Application No. 12840438.1.
"3$^{rd}$ Generation Partnership Project; Technical Specification Group Radio Access Network; Evolved Universal Terrestrial Radio Access (E-UTRA) Radio Resource Control (RRC); Protocol specification (Release 8)", 3GPP TS 36.331, V8.4.0, Dec. 2008, pp. 1-198.
"Change Request: Improvement of higher priority reselection", 3GPP TSG-RAN4 Meeting #60, Athens, Greece, Aug. 2011, 8 pp.

* cited by examiner

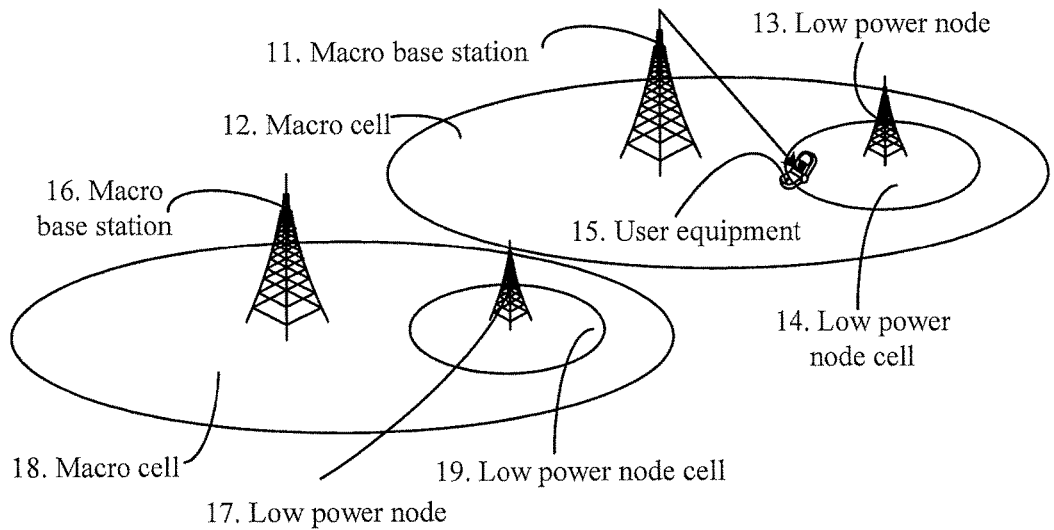

Receive a broadcast message that is sent in a first cell by a base station, where the broadcast message includes information about a set of second cells ~21

When it is determined, according to the information about the set of the second cells, that a target reselection cell is a second cell, determine, according to second-cell reselection parameter information, time for performing cell reselection ~23

┌─────────────────────────────────┐
│ Receive a broadcast message that is sent in a │
│ first cell by a base station, where the │  ~210
│ broadcast message includes information │
│ about a set of second cells │
└─────────────────────────────────┘
                  ↓
┌─────────────────────────────────┐
│ When it is determined, according to the │
│ information about the set of the second cells, │
│ that a target reselection cell is not a second │
│ cell, determine, according to first-cell │  ~230
│ reselection parameter information, time for │
│ performing cell reselection │
└─────────────────────────────────┘

┌─────────────────────────────────┐
│ Generate a broadcast message, where the │
│ broadcast message includes information │  ~31
│ about a set of second cells │
└─────────────────────────────────┘
                  ↓
┌─────────────────────────────────┐
│ Send the broadcast message in a first cell, so │
│ that a user equipment determines, according │
│ to the information about the set of the second │  ~33
│ cells, time for performing cell reselection │
└─────────────────────────────────┘

FIG. 3

CELL RESELECTION METHOD, DEVICE, AND SYSTEM

CROSS-REFERENCE TO RELATED APPLICATIONS

This application is a continuation of International Application No. PCT/CN2012/077483, filed on Jun. 25, 2012, which claims priority to Chinese Patent Application No. 201110310174.4, filed on Oct. 13, 2011, both of which are hereby incorporated by reference in theirs entireties.

TECHNICAL FIELD

Embodiments of the present invention relate to the field of wireless communications, and in particular, to a cell reselection method, device, and system.

BACKGROUND

In the future, a mobile communications system will provide a higher data transmission rate and wider service coverage. To reduce a coverage hole and improve service experience of an edge user, more low power nodes (LPN, Low Power Node) are deployed in a heterogeneous cellular network (that is, a heterogeneous network, also called a Hetnet scenario). In a heterogeneous network, by using a radio access technology, a UE may access not only a macro base station, but also any low power access node in a network. In this case, network coverage is extended, and quality of service (QoS, Quality of Service) of a user is ensured. A low power access node is called a low power node for short in the following.

In an LTE (Long Term Evolution, Long Term Evolution) network, for cell reselection in IDLE (idle) mode, time evaluation is performed for the cell reselection based on a Treselection (called a first-cell reselection time parameter) broadcast by a serving base station. If a value of the Treselection is not 0, a user equipment needs to complete the cell reselection within a set Treselection time segment; if the value of the Treselection is 0 or not configured, the user equipment needs to complete the cell reselection within a set Tevaluate time segment (called a first-cell evaluation time parameter), where the Tevaluate is an integral multiple of a DRX (discontinuous reception, Discontinuous Reception) period configured by a network entity. Refer to Table 1, in which Tevaluates are listed, where a unit of time is second (s).

TABLE 1

| DRX Period Length [s] | Tevaluate [s] (Multiple of a DRX Period) |
|---|---|
| 0.32 | 5.12 (16) |
| 0.64 | 5.12 (8) |
| 1.28 | 6.4 (5) |
| 2.56 | 7.68 (3) |

However, in a heterogeneous network scenario, a network broadcasts only one reselection time value, such as a value of the Treselection, and therefore the following cases may be caused:

Case 1: If the value of the Treselection configured by the network is relatively large, and when a user equipment (UE, User Equipment) moves from a macro cell (Macro cell) to a low power node cell (such as a pico cell, where a pico is one type of low power node), because of a relatively long Treselection time, a user equipment fails to reselect a pico cell in time, and the user equipment may well encounter a radio link failure; or the pico cell may cause relatively strong interference to the UE, so that the UE in IDLE mode fails to receive paging (paging) information from the original macro cell normally.

Case 2: If the value of the Treselection configured by the network is relatively small, and when a UE moves between edges of two macro cells, because of the relatively small Treselection, the UE performs ping-pong cell reselection. This causes frequent reselection of the UE in IDLE mode, so that power-saving performance cannot be well implemented.

Case 3: If the value of the Treselection configured by the network is 0 or not configured, the UE performs cell reselection according to the Tevaluate in Table 1. It can be seen that the evaluation time is at least over 5 s, and for a macrocell-picocell (Macro-pico) scenario, the evaluation time is a relatively long evaluation time. Like case 1, this may cause a radio link failure and a failure in receiving paging (paging) information from a macro cell. As can be seen from the above case analysis, an original time evaluation solution of cell reselection for a macro cell cannot be applied to a heterogeneous network any longer, because it may cause problems such as a link failure, a failure in receiving paging information, and ping-pong reselection.

SUMMARY

Embodiments of the present invention provide a cell reselection method, device, and system, so as to improve cell reselection efficiency.

In one aspect, a cell reselection method is provided and includes: receiving a broadcast message that is sent in a first cell by a base station, where the broadcast message includes information about a set of second cells; and when it is determined, according to the information about the set of the second cells, that a target reselection cell is a second cell, determining, according to second-cell reselection parameter information, time for performing cell reselection.

In another aspect, a cell reselection method is provided and includes: generating a broadcast message, where the broadcast message includes information about a set of second cells; and sending the broadcast message in a first cell.

In another aspect, a cell reselection device is provided and includes: a receiving unit, configured to receive a broadcast message that is sent in a first cell by a base station, where the broadcast message includes information about a set of second cells; and a time determining unit, configured to, when it is determined, according to the information about the set of the second cells that is received by the receiving unit, that a target reselection cell is a second cell, determine, according to second-cell reselection parameter information, time for performing cell reselection.

In another aspect, a cell reselection device is provided and includes: a generating unit, configured to generate a broadcast message, where the broadcast message includes information about a set of second cells; and a sending unit, configured to send, in a first cell, the broadcast message generated by the generating unit, so that a user equipment determines, according to the information about the set of the second cells, time for performing cell reselection.

In another aspect, a cell reselection system is provided and includes either of the foregoing cell reselection devices.

In the embodiments of the present invention, a base station adds new indication information to a broadcast message, and a user equipment determines, according to the indication information, whether a target cell is a low power node, so as to determine time for cell reselection, thereby improving cell reselection efficiency.

The embodiments of the present invention provide a cell reselection method, device, and system, so as to reduce ping-pong cell reselection.

In one aspect, a cell reselection method is provided and includes: receiving a broadcast message that is sent in a first cell by a base station, where the broadcast message includes information about a set of second cells; and when it is determined, according to the information about the set of the second cells, that a target reselection cell is not a second cell, determining, according to first-cell reselection parameter information, time for performing cell reselection.

In another aspect, a cell reselection device is provided and includes: a receiving unit, configured to receive a broadcast message that is sent in a first cell by a base station, where the broadcast message includes information about a set of second cells; and a time determining unit, configured to, when it is determined, according to the information about the set of the second cells that is received by the receiving unit, that a target reselection cell is not a second cell, determine, according to first-cell reselection parameter information, time for performing cell reselection.

In another aspect, a cell reselection device is provided and includes: a generating unit, configured to generate a broadcast message, where the broadcast message includes information about a set of second cells; and a sending unit, configured to send, in a first cell, the broadcast message generated by the generating unit, so that a user equipment determines, according to the information about the set of the second cells, time for performing cell reselection.

In another aspect, a cell reselection system is provided and includes either of the foregoing cell reselection devices.

In the embodiments of the present invention, a base station is capable of adding new indication information to a broadcast message, and a user equipment determines, according to the indication information, whether a target cell is a low power node, so as to determine time for cell reselection, thereby reducing ping-pong cell reselection to save power.

BRIEF DESCRIPTION OF DRAWINGS

To describe the technical solutions in the embodiments of the present invention more clearly, the following briefly introduces the accompanying drawings required for describing the embodiments or the prior art. Apparently, the accompanying drawings in the following description show merely some embodiments of the present invention, and a person of ordinary skill in the art may still derive other drawings from these accompanying drawings without creative efforts.

FIG. 1 is a schematic diagram of an example of an application scenario according to an embodiment of the present invention;

FIG. 2A is a flowchart of a cell reselection method according to an embodiment of the present invention;

FIG. 2B is a flowchart of another cell reselection method according to an embodiment of the present invention;

FIG. 3 is a flowchart of another cell reselection method according to an embodiment of the present invention;

DESCRIPTION OF EMBODIMENTS

Figure 4:
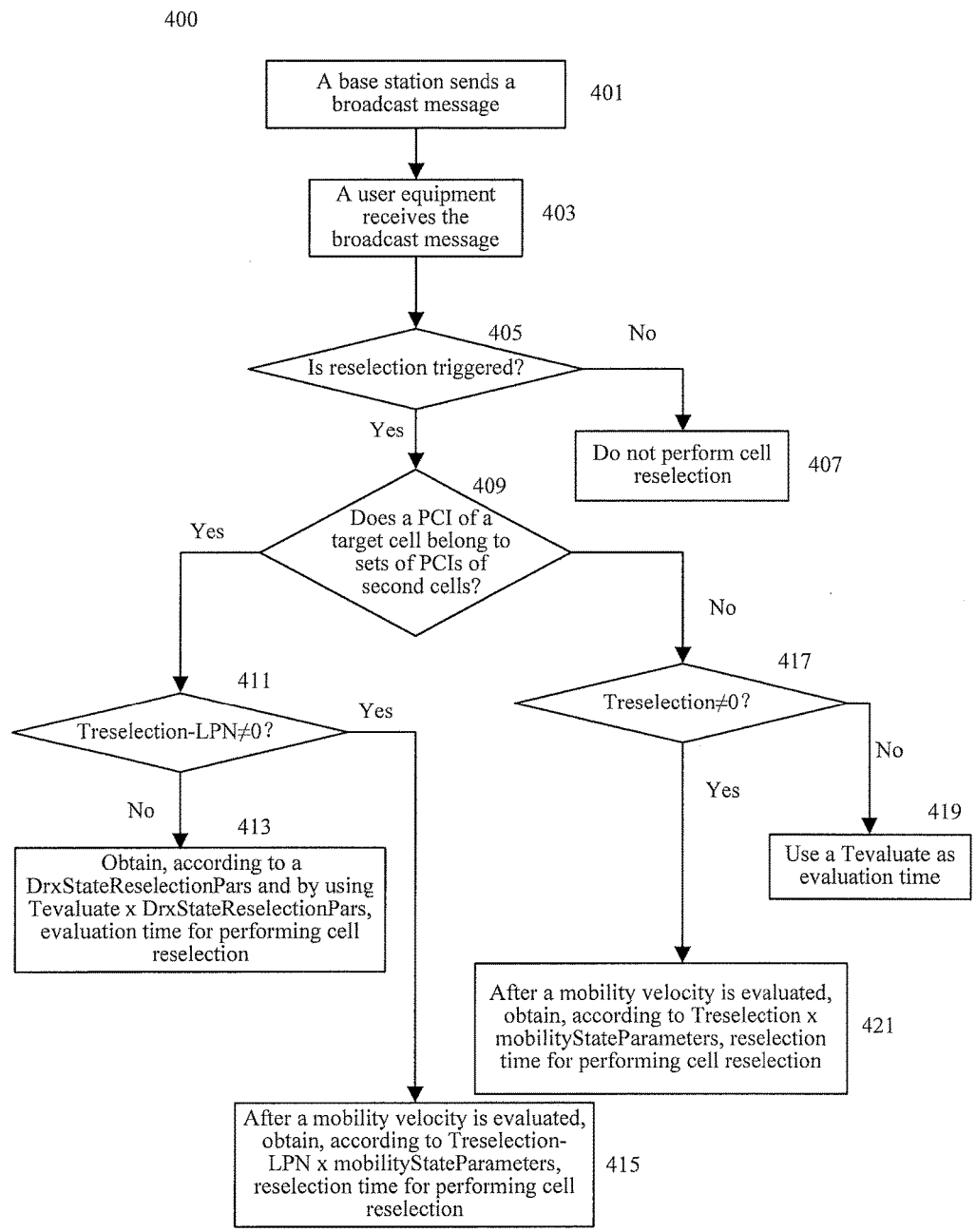
FIG. 4 is a schematic diagram of a cell reselection method according to an embodiment of the present invention.

The following clearly describes the technical solutions in the embodiments of the present invention with reference to the accompanying drawings in the embodiments of the present invention. Apparently, the described embodiments are merely a part rather than all of the embodiments of the present invention. All other embodiments obtained by a person of ordinary skill in the art based on the embodiments of the present invention without creative efforts shall fall within the protection scope of the present invention.

The technical solutions of the present invention may be applied to various communications systems, such as a GSM, a Code Division Multiple Access (CDMA, Code Division Multiple Access) system, Wideband Code Division Multiple Access (WCDMA, Wideband Code Division Multiple Access Wireless), General Packet Radio Service (GPRS, General Packet Radio Service), and Long Term Evolution (LTE, Long Term Evolution).

A user equipment (UE, User Equipment), also called a mobile terminal (Mobile Terminal), a mobile user equipment, or the like, may communicate with one or more core networks through a radio access network (for example, RAN, Radio Access Network). The user equipment may be a mobile terminal, such as a mobile phone (or called a "cellular" phone) or a computer that has a mobile terminal. For example, the user equipment may be a portable, pocket-sized, handheld, computer-embedded, or vehicle-mounted mobile apparatus, which exchanges voice and data with the radio access network.

A base station may be a base transceiver station (BTS, Base Transceiver Station) in GSM or CDMA, a NodeB (NodeB) in WCDMA, or an evolved NodeB (eNB or e-NodeB, evolutional Node B) in LTE, which is not limited in the present invention. However, for ease of description, an eNB is used as an example for description in the following embodiments.

A low power node cell involved in the embodiments of the present invention may include but is not limited to a pico cell, and may further include a Femto cell (a low power node cell applicable to a family) or a cell covered by a relay station (Relay), or may be any node with a resource management function and relatively low transmit power.

A cell reselection method includes: receiving a broadcast message that is sent in a first cell by a base station, where the broadcast message includes information about a set of second cells; and when it is determined, according to the information about the set of the second cells, that a target reselection cell is a second cell, determining, according to second-cell reselection parameter information, time for performing cell reselection.

According to the method, the information about the set of the second cells may be: a set of physical cell identities of the second cells.

According to the method, the second-cell reselection parameter information may include a non-zero second-cell reselection time parameter, and the determining, according to second-cell reselection parameter information, time for performing cell reselection includes: determining that the second-cell reselection time parameter is multiplied by a mobility state parameter, so as to acquire reselection time for performing the cell reselection.

According to the method, the second-cell reselection parameter may further include an evaluation time factor, and the determining, according to second-cell reselection parameter information, time for performing cell reselection includes: determining that the evaluation time factor is multiplied by a first-cell evaluation time parameter, so as to acquire evaluation time for performing the cell reselection.

According to the method, the second-cell reselection parameter information may further include the second-cell reselection time parameter and the evaluation time factor, and the determining, according to second-cell reselection parameter information, time for performing cell reselection includes: when the second-cell reselection time parameter is configured as a non-zero value, determining that the second-cell reselection time parameter is multiplied by the mobility state parameter, so as to acquire the reselection time for performing the cell reselection; and when a value of the second-cell reselection time parameter is zero or not configured, determining that the evaluation time factor is multiplied by the first-cell evaluation time parameter, so as to acquire the evaluation time for performing the cell reselection.

According to the method, a value of the evaluation time factor is a numerical value greater than zero and smaller than 1, including ¼, ⅕, or ⅓.

According to the method, the broadcast message includes: a system information block SIB4 carrying a set of physical cell identities of second cells with a same frequency, where the second cells are controlled by a low power node adjacent to the base station; a system information block SIB5 carrying a set of physical cell identities of second cells with different frequencies, where the second cells are controlled by a low power node adjacent to the base station; and a system information block SIB3 carrying the second-cell reselection parameter information.

According to the method, after the receiving a broadcast message that is sent in a first cell by a base station, the method further includes: when it is determined, according to the information about the set of the second cells, that the target reselection cell is not the second cell, determining, according to first-cell reselection parameter information, time for performing the cell reselection.

A cell reselection method includes: receiving a broadcast message that is sent in a first cell by a base station, where the broadcast message includes information about a set of second cells; and when it is determined, according to the information about the set of the second cells, that a target reselection cell is not a second cell, determining, according to first-cell reselection parameter information, time for performing cell reselection.

According to the method, the determining, according to first-cell reselection parameter information, time for performing cell reselection may include: when a value of a first-cell reselection time parameter in the first-cell reselection parameter information is not zero, determining that the first-cell reselection time parameter is multiplied by a mobility state parameter, so as to acquire reselection time for performing the cell reselection; or when a value of a first-cell reselection time parameter in the first-cell reselection parameter information is zero or not configured, determining, according to a first-cell evaluation time parameter in the first-cell reselection parameter information, time for performing the cell reselection.

A cell reselection method includes: generating a broadcast message, where the broadcast message includes information about a set of second cells; and sending the broadcast message in a first cell, so that a user equipment determines, according to the information about the set of the second cells, time for performing cell reselection.

According to the method, the information about the set of the second cells may be information about a set of physical cell identities of the second cells, where the broadcast message includes:

a system information block SIB4 carrying a set of physical cell identities of second cells with a same frequency, where the second cells are controlled by a low power node adjacent to a base station;

a system information block SIB5 carrying a set of physical cell identities of second cells with different frequencies, where the second cells are controlled by a low power node adjacent to the base station; and a system information block SIB3 carrying second-cell reselection parameter information.

A cell reselection device includes: a receiving unit, configured to receive a broadcast message that is sent in a first cell by a base station, where the broadcast message includes information about a set of second cells; and a time determining unit, configured to, when it is determined, according to the information about the set of the second cells that is received by the receiving unit, that a target reselection cell is a second cell, determine, according to second-cell reselection parameter information, time for performing cell reselection.

According to the device, the information about the set of the second cells that is received by the receiving unit may be: a set of physical cell identities of the second cells.

According to the device, the time determining unit may be configured to, when the second-cell reselection parameter information includes a non-zero second-cell reselection time parameter, determine that the second-cell reselection time parameter is multiplied by a mobility state parameter, so as to acquire reselection time for performing the cell reselection.

According to the device, the time determining unit may further be configured to, when the second-cell reselection parameter includes an evaluation time factor, determine that the evaluation time factor is multiplied by a first-cell evaluation time parameter, so as to acquire evaluation time for performing the cell reselection.

According to the device, the time determining unit is further configured to, when the second-cell reselection parameter information includes the evaluation time factor and the second-cell reselection time parameter and a value of the second-cell reselection time parameter is zero or not configured, determine that the evaluation time factor is multiplied by the first-cell evaluation time parameter, so as to acquire the evaluation time for performing the cell reselection.

According to the device, a value of the evaluation time factor is a numerical value greater than zero and smaller than 1, including ¼, ⅕, or ⅓.

According to the device, the broadcast message received by the receiving unit includes: a system information block SIB4 carrying a set of physical cell identities of second cells with a same frequency, where the second cells are controlled by a low power node adjacent to the base station; a system information block SIB5 carrying a set of physical cell identities of second cells with different frequencies, where the second cells are controlled by a low power node adjacent to the base station; and a system information block SIB3 carrying the second-cell reselection parameter information.

According to the device, the time determining unit may further be configured to, when it is determined, according to the information about the set of the second cells, that the target reselection cell is not the second cell, determine, according to first-cell reselection parameter information, time for performing the cell reselection.

A cell reselection device includes: a receiving unit, configured to receive a broadcast message that is sent in a first cell by a base station, where the broadcast message includes information about a set of second cells; and a time determining unit, configured to, when it is determined, according to the information about the set of the second cells that is received by the receiving unit, that a target reselection cell is not a second cell, determine, according to first-cell reselection parameter information, time for performing cell reselection.

According to the device, the time determining unit may be configured to: when a value of a first-cell reselection time parameter in the first-cell reselection parameter information is not zero, determine that the first-cell reselection time parameter is multiplied by a mobility state parameter, so as to acquire reselection time for performing the cell reselection; or when a value of a first-cell reselection time parameter in the first-cell reselection parameter information is zero or not configured, determine that a first-cell evaluation time parameter in the first-cell reselection parameter information is used for performing the cell reselection.

A cell reselection device includes: a generating unit, configured to generate a broadcast message, where the broadcast message includes information about a set of second cells; and a sending unit, configured to send, in a first cell, the broadcast message generated by the generating unit, so that a user equipment determines, according to the information about the set of the second cells, time for performing cell reselection.

According to the device, in the broadcast message generated by the generating unit, the information about the set of the second cells is information about a set of physical cell identities of the second cells; and the broadcast message that the generating unit is configured to generate includes: a system information block SIB 4 carrying a set of physical cell identities of second cells with a same frequency, where the second cells are controlled by a low power node adjacent to a base station;

a system information block SIB5 carrying a set of physical cell identities of second cells with different frequencies, where the second cells are controlled by a low power node adjacent to the base station; and a system information block SIB3 carrying second-cell reselection parameter information.

A cell reselection system includes: any one of the foregoing devices.

A first cell in the context refers to a macro cell controlled by a macro base station, and a second cell refers to a low power node cell controlled by a low power node.

FIG. 1 is a schematic diagram of an example of an application scenario according to an embodiment of the present invention.

This scenario includes macro base stations 11 and 16, low power nodes 13 and 17, and a user equipment 15. The user equipment 15 moves from a macro cell 12 controlled by the macro base station 11 to a low power node cell 14 controlled by the low power node 13. In this case, the user equipment 15 is faced with a problem of cell reselection.

The scenario in FIG. 1 is merely an example. This embodiment of the present invention may be applied to a heterogeneous network scenario. A heterogeneous network includes: macro base stations, such as 11 and 16 in FIG. 1, and cells covered by them are macro cells, including 12 and 18 respectively in FIG. 1; and low power nodes, such as 13 and 17 in FIG. 1, and cells covered by them are low power node cells, including 14 and 19 respectively in FIG. 1.

FIG. 2A is a flowchart of a cell reselection method 20 according to an embodiment of the present invention, and a user equipment in a radio communications system may implement the method 20.

As shown in FIG. 2A, the method 20 includes:

Step 21: Receive a broadcast message that is sent in a first cell by a base station, where the broadcast message includes information about a set of second cells.

The foregoing broadcast message may include a broadcast message carrying a set of physical cell identities (PCI, physical cell identity) of low power node cells (second cells) that are adjacent to the base station and a second-cell reselection time parameter (Treselection-LPN) or a set of physical cell identities (PCI, physical cell identity) of low power node cells (second cells) and an evaluation time factor (DrxStateReselectionPars), or may include a broadcast message carrying all the foregoing information. The foregoing second-cell reselection time parameter is reference time configured, when a physical cell identity of a target cell (target cell) belongs to the set of the physical cell identities of the second cells, for the user equipment to perform cell reselection; and the evaluation time factor is a multiplication factor of evaluation time of the target cell and a first-cell evaluation time parameter (Tevaluate).

The second cells may be low power nodes in coverage of the base station or a macro base station around the base station, for example, 13 and 17 in FIG. 1.

The user equipment receives the broadcast message sent by the base station, where the broadcast message carries a Treselection, a Tevaluate, a mobility state parameter (mobilityStateParameters), and the like.

In addition, the broadcast message may include: a system information block SIB4 carrying a set of physical cell identities of second cells with a same frequency, where the second cells are controlled by a low power node adjacent to the base station; a system information block SIB5 carrying a set of physical cell identities of second cells with different frequencies, where the second cells are controlled by a low power node adjacent to the base station; and a system information block SIB3 carrying second-cell reselection parameter information.

The second-cell reselection parameter information may include the second-cell reselection time parameter or the evaluation time factor, or may include both the second-cell reselection time parameter and the evaluation time factor. A value of the evaluation time factor is a numerical value greater than zero and smaller than 1, including ¼, ⅕, or ⅓.

According to different values of the Tevaluate in Table 1, a value of the evaluation time factor is exemplarily shown in Table 2.

TABLE 2

| DRX Period Length [s] | Tevaluate [s] (Multiple of a DRX Period) | DrxStateReselectionPars |
|---|---|---|
| 0.32 | 5.12 (16) | ¼ |
| 0.64 | 5.12 (8) | ¼ |
| 1.28 | 6.4 (5) | ⅕ |
| 2.56 | 7.68 (3) | ⅓ |

Step 23: When it is determined, according to the information about the set of the second cells, that a target reselection cell is a second cell, determine, according to the second-cell reselection parameter information, time for performing cell reselection.

A set of the physical cell identities of the second cells includes: the set of physical cell identities of second cells with a same frequency, where the set of the physical cell identities of the second cells with the same frequency is carried in SIB4; and the set of physical cell identities of second cells with different frequencies, where the set of the physical cell identities of the second cells with the different frequencies is carried in SIB5. When the second-cell reselection parameter information includes a non-zero second-cell reselection time parameter, it is determined that the second-cell reselection time parameter is multiplied by a mobility state parameter, so as to acquire reselection time for performing the cell reselection.

When a second-cell reselection parameter includes the evaluation time factor, it is determined that the evaluation time factor is multiplied by the first-cell evaluation time parameter, so as to acquire evaluation time for performing the cell reselection.

In this embodiment of the present invention, a base station is capable of adding new indication information to a broadcast message, and a user equipment determines, according to the indication information, whether a target cell is a low power node, so as to determine time for cell reselection, thereby improving cell reselection efficiency.

In addition, when second-cell reselection parameter information includes both a second-cell reselection time parameter and an evaluation time factor, and a value of the second-cell reselection time parameter is zero or not configured, it is determined that the evaluation time factor is multiplied by a first-cell evaluation time parameter, so as to acquire evaluation time for performing cell reselection. This further solves a problem of ping-pong cell reselection and can save power.

A network configuration includes a Treselection and a Treselection-LPN. When a user equipment moves from a macro cell to a low power node cell, in one case, for example, when a value of the Treselection-LPN is not zero, the user equipment may determine to perform reselection within Treselection-LPN×mobilityStateParameters. Because the value of the Treselection-LPN is smaller than a value of the Treselection, the user equipment reselects the low power node cell in time. This improves efficiency, reduces a radio link connection failure, and reduces relatively strong interference caused by the low power node cell to the user equipment, so that the user equipment in IDLE mode fails to receive paging (paging) information from the original macro cell normally. In another case, when a value of the time Treselction-LPN is 0 or not configured and a target cell is a cell in a set of adjacent low power node cells, because the network configuration includes the evaluation time factor, the user equipment performs reselection within a time Tevaluate×DrxStateReselectionPars, and the user equipment can also reselect the low power node cell in time. This improves efficiency, reduces a radio link connection failure, and reduces relatively strong interference caused by the low power node cell to the user equipment, so that the user equipment in IDLE mode fails to receive paging information from the original macro cell normally.

As another embodiment, FIG. 2B is a flowchart of a cell reselection method 200 according to an embodiment of the present invention. A difference from the method 20 is that it is determined, according to information about a set of second cells, that a target reselection cell is not a second cell.

Step 210 is the same as or similar to step 21 of the method 20, that is, receive a broadcast message that is sent in a first cell by a base station, where the broadcast message includes information about a set of second cells.

Step 230: When it is determined, according to the information about the set of the second cells, that a target reselection cell is not a second cell, determine, according to first-cell reselection parameter information, time for performing cell reselection.

When a value of a first-cell reselection time parameter in the first-cell reselection parameter information is not zero, it is determined that the first-cell reselection time parameter is multiplied by a mobility state parameter, so as to acquire reselection time for performing the cell reselection; or when a value of a first-cell reselection time parameter in the first-cell reselection parameter information is zero or not configured, it is determined that a first-cell evaluation time parameter in the first-cell reselection parameter information is used for performing the cell reselection.

That is, when a network configuration includes a Treselection and a Treselection-LPN whose value is smaller than the time Treselection, the Treselection is configured properly. In this case, when a value of the Treselection is relatively small and a user equipment moves between edges of two macro cells, frequent reselection that is performed by the UE in IDLE mode due to the relatively small Treselection is reduced, so that power can be better saved.

FIG. 3 is a flowchart of another cell reselection method 30 according to an embodiment of the present invention, and a base station in a radio communications system may implement the method 30.

As shown in FIG. 3, the method 30 includes:

Step 31: Generate a broadcast message, where the broadcast message includes information about a set of second cells.

The foregoing broadcast message may include a broadcast message carrying a set of physical cell identities (PCI, Physical Cell Identity) of low power node cells (second cells) that are adjacent to the base station and a second-cell reselection time parameter (Treselection-LPN) or a set of physical cell identities (PCI, Physical Cell Identity) of low power node cells (second cells) and an evaluation time factor (DrxStateReselectionPars), or may include a broadcast message carrying all the foregoing information. The foregoing second-cell reselection time parameter is reference time configured, when a physical cell identity of a target cell (target cell) belongs to the set of the physical cell identities of the second cells, for the user equipment to perform cell reselection; and the evaluation time factor is a multiplication factor of evaluation time of the target cell and a first-cell evaluation time parameter (Tevaluate).

The adjacent second cells may be low power nodes in coverage of the base station or a macro base station around the base station, for example, 13 and 17 in FIG. 1.

The broadcast message sent by the base station carries a Treselection, a Tevaluate, a mobility state parameter (mobilityStateParameters), and the like.

In addition, the broadcast message may include: a system information block SIB4 carrying the set of physical cell identities of second cells with a same frequency, where the second cells are controlled by a low power node adjacent to the base station;

a system information block SIB5 carrying a set of physical cell identities of second cells with different frequencies, where the second cells are controlled by a low power node adjacent to the base station; and a system information block SIB3 carrying second-cell reselection parameter information.

The second-cell reselection parameter information may include the second-cell reselection time parameter or the evaluation time factor, or may include both the second-cell reselection time parameter and the evaluation time factor. A value of the evaluation time factor is a numerical value greater than zero and smaller than 1, including ¼, ⅕, or ⅓. Refer to examples in Table 2.

Step 33: Send the broadcast message in a first cell, so that the user equipment determines, according to the information about the set of the second cells, time for performing cell reselection.

In this embodiment of the present invention, a base station is capable of adding new indication information to a broadcast message, so that a user equipment determines, according to the indication information, whether a target cell is a low power node, so as to determine time for cell reselection, thereby improving cell reselection efficiency and saving power.

FIG. 4 is a schematic diagram of a cell reselection method 400 according to an embodiment of the present invention.

As shown in FIG. 4, the method 400 includes:

Step 401: A base station sends a broadcast message.

The base station broadcasts, in a SIB4 and a SIB5 respectively, sets of PCIs of adjacent low power nodes with a same frequency or different frequencies (sets of PCIs of second cells), and broadcasts a configured Treselection, Tevaluate, mobilityStateParameters, and Treselection-LPN and an evaluation time factor (DrxStateReselectionPars) to a user equipment by using a SIB3.

Step 403: The user equipment receives the broadcast message sent by the base station.

Step 405: When the user equipment is moving, if an S rule is triggered, or an R rule is triggered, and when it is determined that cell reselection needs to be performed, proceed to step 409; otherwise, if it is determined that cell reselection is not required, perform step 407, and do not perform the cell reselection operation.

Step 409: The user equipment determines a target cell type; when it is identified that a PCI of a target cell does not belong to the sets of the PCIs of the second cells that are carried in the broadcast message, determine that the target cell is a macro cell, and proceed to step 417; or when a PCI of a target cell belongs to the sets of the PCIs of the second cells that are carried in the broadcast message, determine that the target cell is a low power node cell, and proceed to step 411.

Step 411: If the target cell is a low power node cell, and a value of the Treselection-LPN carried in the broadcast message is equal to 0 or not configured, proceed to step 413, that is, obtain, according to the DrxStateReselectionPars and by using Tevaluate×DrxStateReselectionPars, evaluation time for performing cell reselection, so as to perform the cell reselection within the time.

Because the Treselection-LPN is configured in a network configuration and the network configuration includes the evaluation time factor, and when the user equipment moves from a macro cell to a low power node cell and the target cell is a cell in a set of adjacent low power node cells, the user equipment performs reselection within a time Tevaluate× DrxStateReselectionPars, so that the user equipment can reselect a low power node cell in time. This improves efficiency, reduces a radio link connection failure, and reduces relatively strong interference caused by the low power node cell to the user equipment, so that the user equipment in IDLE mode fails to receive paging information from the original macro cell normally.

If the target cell is a low power node cell, and the value of the Treselection-LPN carried in the broadcast message is not equal to 0, step 415 is proceeded to, that is, the Treselection-LPN is used as evaluation reference time for cell reselection; and after a mobility velocity is evaluated, reselection time is obtained according to Treselection-LPN× mobilityStateParameters, so as to perform the cell reselection within the time.

When the user equipment moves from a macro cell to a low power node cell, for example, when a value of the Treselction-LPN is not zero, the user equipment may determine that reselection is performed within the Treselection-LPN×mobilityStateParameters. Because the value of the Treselection-LPN is smaller than a value of the Treselection, the user equipment reselects the low power node cell in time. This improves efficiency, reduces a radio link connection failure, and reduces relatively strong interference caused by the low power node cell to the user equipment, so that the user equipment in IDLE mode fails to receive paging information from the original macro cell normally.

In step 413 and step 415, cell reselection efficiency can be improved.

Step 417: If the target cell is a macro cell, and the value of the Treselection carried in the broadcast message is equal to 0 or not configured, proceed to step 419, that is, use the Tevaluate listed in Table 1 as the evaluation time for performing cell reselection, so as to perform the cell reselection within the time.

If the target cell is a macro cell, and the value of the Treselection carried in the broadcast message is not equal to 0, step 421 is proceeded to, that is, the Treselection is used as evaluation reference time for cell reselection; and after a mobility velocity is evaluated, reselection time is obtained according to Treselection×mobilityStateParameters, so as to perform the cell reselection within the time.

In step 419 and step 421, ping-pong cell reselection can be reduced, thereby saving power.

In this embodiment of the present invention, a base station is capable of adding new indication information to a broadcast message, so that a user equipment determines, according to the indication information, whether a target cell is a low power node, so as to determine time for cell reselection, thereby improving cell reselection efficiency and saving power.

Figure 5A:
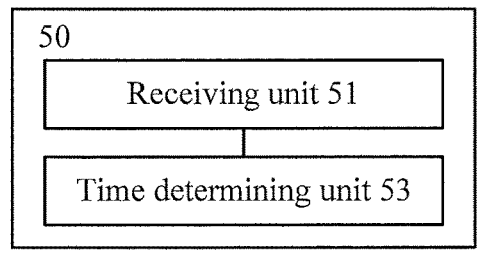
FIG. 5A is a block diagram of a cell reselection device according to an embodiment of the present invention.

FIG. 5 is a block diagram of a cell reselection device 50 according to an embodiment of the present invention.

The device 50 includes a receiving unit 51 and a time determining unit 53. As an implementation manner, the device 50 may be implemented by a user equipment in a radio communications system.

The receiving unit 51 is configured to receive a broadcast message that is sent in a first cell by a base station, where the broadcast message includes information about a set of second cells.

The time determining unit 53 is configured to, when it is determined, according to the information about the set of the second cells that is received by the receiving unit 51, that a target reselection cell is a second cell, determine, according to second-cell reselection parameter information, time for performing cell reselection.

The device 50 implements the method 20, and details are not described herein again.

In this embodiment of the present invention, a base station is capable of adding new indication information to a broadcast message, and a user equipment determines, according to the indication information, whether a target cell is a low power node, so as to determine time for cell reselection, thereby improving cell reselection efficiency.

Figure 5B:
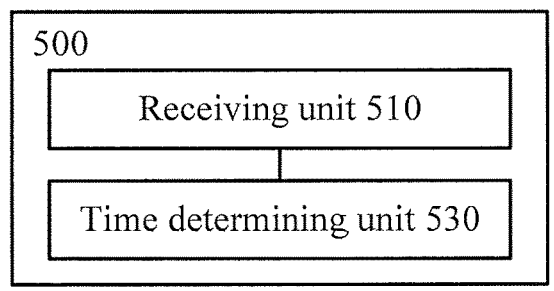
FIG. 5B is a block diagram of another cell reselection device according to an embodiment of the present invention.

FIG. 5B is a block diagram of another cell reselection device 500 according to an embodiment of the present invention.

The device 500 includes a receiving unit 510 and a time determining unit 530. The receiving unit 510 is the same as or similar to the receiving unit of the device 50. A difference between the time determining unit 530 and the time determining unit 53 is that the time determining unit 530 is configured to, when it is determined, according to information about a set of second cells that is received by the receiving unit 510, that a target reselection cell is not a second cell, determine, according to first-cell reselection parameter information, time for performing cell reselection. As one of the implementation manners, the device 50 and the device 500 may be a same device.

The device 500 implements the method 300, and details are not described herein again.

In this embodiment of the present invention, a base station is capable of adding new indication information to a broadcast message, and a user equipment determines, according to the indication information, whether a target cell is a low power node, so as to determine time for cell reselection, thereby reducing ping-pong cell reselection to save power.

Figure 6:
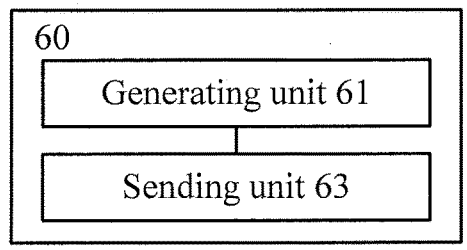
FIG. 6 is a block diagram of another cell reselection device according to an embodiment of the present invention.

FIG. 6 is a block diagram of another cell reselection device 60 according to an embodiment of the present invention.

The device 60 includes a generating unit 61 and a sending unit 63. As an implementation manner, the device 60 may be implemented by a base station in a radio communications system.

The generating unit 61 is configured to generate a broadcast message, where the broadcast message includes information about a set of second cells.

The sending unit 63 is configured to send, in a first cell, the broadcast message generated by the generating unit 61, so that the user equipment determines, according to the information about the set of the second cells, time for performing cell reselection.

In this embodiment of the present invention, a base station is capable of adding new indication information to a broadcast message, and a user equipment determines, according to the indication information, whether a target cell is a low power node, so as to determine time for cell reselection, thereby improving cell reselection efficiency and reducing ping-pong cell reselection to save power.

Figure 7:
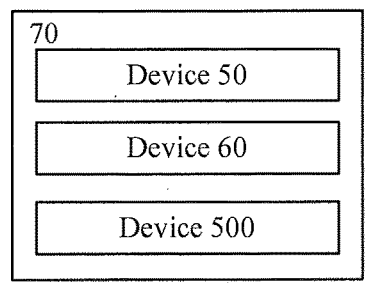
FIG. 7 is a block diagram of a cell reselection system according to an embodiment of the present invention.

FIG. 7 is a block diagram of a cell reselection system 70 according to an embodiment of the present invention.

The system 70 includes the device 50, the device 500, or the device 60. As a different implementation manner, the system may be a radio communications system under various standards.

The device 50 includes the receiving unit 51 and the time determining unit 53; the device 500 includes the receiving unit 510 and the time determining unit 530; and the device 60 includes the generating unit 61 and the sending unit 63.

The system 70 implements the method 20, 200, or 300, and details are not described herein again.

In this embodiment of the present invention, a base station is capable of adding new indication information to a broadcast message, and a user equipment determines, according to the indication information, whether a target cell is a low power node, so as to determine time for cell reselection, thereby improving cell reselection efficiency and reducing ping-pong cell reselection to save power.

A person of ordinary skill in the art may be aware that, in combination with the examples described in the embodiments disclosed in this specification, units and algorithm steps may be implemented by electronic hardware, or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in the present application, it should be understood that the disclosed system, apparatus, and method may be implemented in other manners. For example, the described apparatus embodiments are merely exemplary. For example, the unit division is merely logical function division and may be other division in actual implementation. For example, multiple units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and the parts displayed as units may or may not be physical units, may be located in one position, or may be distributed on multiple network units. A part of or all of the units may be selected according to actual needs to achieve the objectives of the solutions of the embodiments.

In addition, functional units in the embodiments of the present invention may be integrated into one processing unit, or each of the units may exist alone physically, or two or more units may be integrated into one unit.

When the functions are implemented in a form of a software functional unit and sold or used as an independent product, the functions may be stored in a computer-readable storage medium. Based on such an understanding, the technical solutions of the present invention essentially, or the part contributing to the prior art, or a part of the technical solutions may be implemented in a form of a software product. The computer software product is stored in a storage medium and includes several instructions for instructing a computer device (which may be a personal computer, a server, or a network device) to perform all or a part of the steps of the methods described in the embodiments of the present invention. The foregoing storage medium includes: any mediums that can store program code, such as a USB flash drive, a removable hard disk, a read-only memory (ROM, Read-Only Memory), a random access memory (RAM, Random Access Memory), a magnetic disk, or an optical disc.

The foregoing descriptions are merely specific embodiments of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the appended claims.

What is claimed is:

1. A cell reselection method, comprising:
receiving a broadcast message sent in a first cell by a base station, the broadcast message comprising first-cell reselection parameter information and information about a set of second cells including second-cell reselection parameter information for the second cells which are cells corresponding to low power nodes (LPNs);
determining, according to the information about the set of the second cells, whether a target reselection cell is a second cell from the set of second cells which correspond to the LPNs;
determining, upon the second-cell reselection parameter information not including a non-zero second-cell reselection time parameter, Treselection-LPN, which is a reselection time when the target reselection cell is the second cell, that the first-cell reselection parameter information is used in addition to the second-cell reselection parameter information to determine a time for performing cell reselection when the target reselection cell is a second cell from the set of second cells which correspond to the LPNs; and
when it is determined that a target reselection cell is the second cell from the set of second cells which correspond to the LPNs, determining, according to at least the second-cell reselection parameter information, the time for performing cell reselection, wherein:
the first-cell reselection parameter information includes information for obtaining an evaluation time for performing the cell reselection, and
the second-cell reselection parameter information includes information for obtaining an evaluation time for performing the cell reselection when the target reselection cell is the second cell from the set of second cells which corresponds to the LPNs, wherein:
the second-cell reselection parameter information comprises an evaluation time factor,
the determining, according to the second-cell reselection parameter information, the time for performing cell reselection comprises determining that the evaluation time factor is multiplied by a first-cell evaluation time parameter, Tevaluate, included in the first-cell reselection parameter information, so as to acquire evaluation time for performing the cell reselection, and
a value of the evaluation time factor is a numerical value greater than zero and smaller than 1, comprisinq ¼, ⅕, or ⅓.

2. The method according to claim 1, wherein the information about the set of the second cells further comprises a set of physical cell identities (PCIs) of the second cells.

3. The method according to claim 1, wherein the second-cell reselection parameter information comprises a non-zero second-cell reselection time parameter, and the determining, according to the second-cell reselection parameter information, the time for performing cell reselection comprises:
determining that the second-cell reselection time parameter is multiplied by a mobility state parameter included in the received broadcast message, so as to acquire reselection time for performing the cell reselection.

4. The method according to claim 1, wherein the second-cell reselection parameter information further comprises a second-cell reselection time parameter, and the determining, according to the second-cell reselection parameter information, the time for performing cell reselection comprises:
when a value of the second-cell reselection time parameter is zero or not configured, determining that the evaluation time factor is multiplied by the first-cell evaluation time parameter, so as to acquire the evaluation time for performing the cell reselection.

5. The method according to claim 2, wherein the broadcast message comprises:
a system information block SIB4 carrying a set of PCIs of second cells with a same frequency, the second cells being controlled by at least one LPN adjacent to the base station,
a system information block SIB5 carrying a set of PC's of second cells with different frequencies, the second cells being controlled by at least one LPN adjacent to the base station, and
a system information block SIB3 carrying the second-cell reselection parameter information.

6. The method according to claim 1, wherein after the receiving a broadcast message sent in a first cell by a base station, the method further comprises:
when it is determined, according to the information about the set of the second cells, that a target reselection cell is not a second cell, determining, according to the first-cell reselection parameter information, time for performing cell reselection.

7. The method according to claim 1, further comprising, when it is determined that a target reselection cell is not a second cell, determining, according to the first-cell reselection parameter information, the time for performing cell reselection.

8. The method according to claim 7, wherein the determining, according to the first-cell reselection parameter information, the time for performing cell reselection comprises:
when a value of a first-cell reselection time parameter in the first-cell reselection parameter information is not zero, determining that the first-cell reselection time parameter is multiplied by a mobility state parameter included in the received broadcast message, so as to acquire reselection time for performing the cell reselection; and
when a value of a first-cell reselection time parameter in the first-cell reselection parameter information is zero or not configured, determining that a first-cell evaluation time parameter in the first-cell reselection parameter information is used for performing the cell reselection.

9. A cell reselection device, comprising:
at least one hardware processor; and
a memory interfaced to the at least one processor, the memory storing instructions which are executed by the at least one hardware processor to implement:
a receiving unit, configured to receive a broadcast message sent in a first cell by a base station, the broadcast message comprising first-cell reselection parameter information and information about a set of second cells including second-cell reselection parameter information for the second cells which are cells corresponding to low power nodes (LPNs); and
a time determining unit, configured to:
determine, according to the information about the set of the second cells, whether a target reselection cell is a second cell from the set of second cells which correspond to the LPNs;
determine, upon the second-cell reselection parameter information not including a non-zero second-cell reselection time parameter, Treselection-LPN, which is a reselection time when the target reselection cell is the second cell, that the first-cell reselection parameter information is used in addition to the second-cell reselection parameter information to determine a time for performing cell reselection when the target reselection cell is a second cell from the set of second cells which correspond to the LPNs; and when it is determined that a target reselection cell is a second cell from the set of second cells which correspond to the LPNs, determine, according to the second-cell reselection parameter information, the time for performing cell reselection, wherein:

the first-cell reselection parameter information includes information for obtaining an evaluation time for performing the cell reselection, and the second-cell reselection parameter information includes information for obtaining an evaluation time for performing the cell reselection when the target reselection cell is the second cell from the set of second cells which corresponds to the LPNs, wherein:

the time determining unit is configured to, when the second-cell reselection parameter information comprises an evaluation time factor, determine that the evaluation time factor is multiplied by a first-cell evaluation time parameter, Tevaluate, included in the first-cell reselection parameter information, so as to acquire evaluation time for performing the cell reselection, and when the second-cell reselection parameter information further comprises a second-cell reselection time parameter and a value of the second-cell reselection time parameter is zero or not configured, determine that the evaluation time factor is multiplied by the first-cell evaluation time parameter, so as to acquire the evaluation time for performing the cell reselection, and wherein a value of the evaluation time factor is a numerical value greater than zero and smaller than 1, comprising ¼, ⅕, or ⅓.

10. The device according to claim 9, wherein the information about the set of the second cells received by the receiving unit further comprises a set of physical cell identities (PCIs) of the second cells.

11. The device according to claim 9, wherein:
the time determining unit is configured to, when the second-cell reselection parameter information comprises a non-zero second-cell reselection time parameter, determine that the second-cell reselection time parameter is multiplied by a mobility state parameter included in the received broadcast message, so as to acquire reselection time for performing the cell reselection.

12. The device according to claim 10, wherein the broadcast message received by the receiving unit comprises:
a system information block SIB4 carrying a set of PCIs of second cells with a same frequency, the second cells being controlled by at least one LPN adjacent to the base station;
a system information block SIB5 carrying a set of PCIs of second cells with different frequencies, the second cells being controlled by at least one LPN adjacent to the base station; and
a system information block SIB3 carrying the second-cell reselection parameter information.

13. The device according to claim 9, wherein:
the time determining unit is further configured to, when it is determined, according to the information about the set of the second cells, that a target reselection cell is not a second cell, determine, according to the first-cell reselection parameter information, time for performing cell reselection.

14. The device according to claim 9, wherein when the time determining unit determines that a target reselection cell is not a second cell from the set of second cells which correspond to the LPNs, determine, according to the first-cell reselection parameter information, the time for performing cell reselection.

15. The device according to claim 14, wherein:
the time determining unit is configured to: when a value of a first-cell reselection time parameter in the first-cell reselection parameter information is not zero, determine that the first-cell reselection time parameter is multiplied by a mobility state parameter included in the received broadcast message, so as to acquire reselection time for performing the cell reselection; and
when a value of a first-cell reselection time parameter in the first-cell reselection parameter information is zero or not configured, determine that a first-cell evaluation time parameter in the first-cell reselection parameter information is used for performing the cell reselection.

* * * * *

UNITED STATES PATENT AND TRADEMARK OFFICE
CERTIFICATE OF CORRECTION

PATENT NO. : 9,949,182 B2
APPLICATION NO. : 14/249699
DATED : April 17, 2018
INVENTOR(S) : Tong Wu et al.

It is certified that error appears in the above-identified patent and that said Letters Patent is hereby corrected as shown below:

In the Claims
Column 15, Line 49, In Claim 1, delete "comprisinq" and insert -- comprising --, therefore.

Signed and Sealed this
Fifth Day of June, 2018

Andrei Iancu
*Director of the United States Patent and Trademark Office*